United States Patent
Ledbetter

(10) Patent No.: US 9,275,813 B1
(45) Date of Patent: *Mar. 1, 2016

(54) REMOTE RACKING TOOL

(71) Applicant: Finley Lee Ledbetter, Argyle, TX (US)

(72) Inventor: Finley Lee Ledbetter, Argyle, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 14/215,813

(22) Filed: Mar. 17, 2014

Related U.S. Application Data

(63) Continuation of application No. 13/253,925, filed on Oct. 5, 2011, now Pat. No. 8,671,556, which is a continuation-in-part of application No. 12/500,523, filed on Jul. 9, 2009, now Pat. No. 8,151,452.

(51) Int. Cl.
*B23P 19/00* (2006.01)
*H01H 49/00* (2006.01)

(52) U.S. Cl.
CPC ............ *H01H 49/00* (2013.01); *Y10T 29/49826* (2015.01); *Y10T 29/53248* (2015.01)

(58) Field of Classification Search
CPC .......... H02B 3/00; H02B 11/04; H02B 11/00; H02B 1/52; Y10T 29/53248; Y10T 29/49105; Y10T 29/49826; Y10T 29/49799
USPC ........... 29/622, 418, 428, 464, 756, 762, 764, 29/876; 200/50.21, 50.24, 50.26, 200, 296

See application file for complete search history.

(56) References Cited

U.S. PATENT DOCUMENTS

| | | | |
|---|---|---|---|
| 4,668,035 A | 5/1987 | Jego et al. | |
| 4,713,501 A | 12/1987 | Herrmann | |
| 5,330,213 A | 7/1994 | Peruso | |
| 5,397,869 A | 3/1995 | Huen | |
| 5,465,031 A | 11/1995 | Nilssen | |
| 5,477,017 A | 12/1995 | Swindler et al. | |
| 6,404,620 B1 | 6/2002 | Piccione | |
| 6,777,627 B1 | 8/2004 | Stevenson | |
| 6,897,388 B2 | 5/2005 | Greer | |
| 6,951,990 B1 | 10/2005 | Miller | |
| 7,019,230 B1 | 3/2006 | Vaill et al. | |
| 7,804,201 B1 | 9/2010 | Ledbetter | |
| 7,825,344 B2 | 11/2010 | Stevenson | |
| 8,395,065 B2 * | 3/2013 | Zylstra et al. | 200/50.24 |
| 8,410,389 B2 * | 4/2013 | Trussler et al. | 218/154 |
| 2003/0200648 A1 | 10/2003 | Greer | |
| 2005/0194243 A1 | 9/2005 | Prineppi | |
| 2010/0024191 A1 | 2/2010 | Ledbetter | |

* cited by examiner

*Primary Examiner* — Thiem Phan
(74) *Attorney, Agent, or Firm* — Gardere Wynne Sewell LLP

(57) ABSTRACT

A remote racking tool can have a drive assembly, remote control assembly, and radio remote pendant station. The remote racking can enable operators to install or remove circuit breakers in switchgear or equipment rooms while outside of an arc flash zone.

4 Claims, 4 Drawing Sheets

REMOTE RACKING TOOL

CROSS REFERENCE TO RELATED APPLICATIONS

This application is a continuation of U.S. application Ser. No. 13/253,925 filed Oct. 5, 2011, allowed, which will issue as U.S. Pat. No. 8,671,556 on Mar. 18, 2014, which is a continuation-in-part of U.S. application Ser. No. 12/500,523 filed on Jul. 9, 2009, now U.S. Pat. No. 8,151,452, granted Apr. 10, 2012, which are hereby incorporated by reference in their entirety.

FIELD

The present embodiments generally relate to a remote racking tool for use with circuit breakers and switchgears in industrial plants, refineries, offshore oil platforms, hotels, hospitals, and other facilities.

BACKGROUND

A need exists for a remote racking tool that is portable and can be carried by a single person without assistance.

A further need exists for a remote racking tool that has a remote control assembly for operating the remote racking tool, and a separate radio remote pendant station for operating the remote control assembly, such that an operator can remain outside of an arc flash zone.

A further need exists for a remote racking tool that can be removably attached to metal surfaces around circuit breakers or other electrical equipment needing installation or removal without modification to the existing switchgear.

A further need exists for a remote racking tool that can be remotely operated by an operator safely outside an arc flash zone, without requiring a physical connection to the remote racking tool or remote control assembly.

A further need exists for a lightweight durable remote racking tool that can sustain significant torque, is reconfigurable, and is modular; thereby enabling any component of the remote racking tool to be removed and replaced without having to replace the entire remote racking tool.

A further need exists for a remote racking tool configured for use with circuit breakers, switchgear, and the like.

The present embodiments meet these needs.

BRIEF DESCRIPTION OF THE DRAWINGS

The detailed description will be better understood in conjunction with the accompanying drawings as follows.

Figure 1:
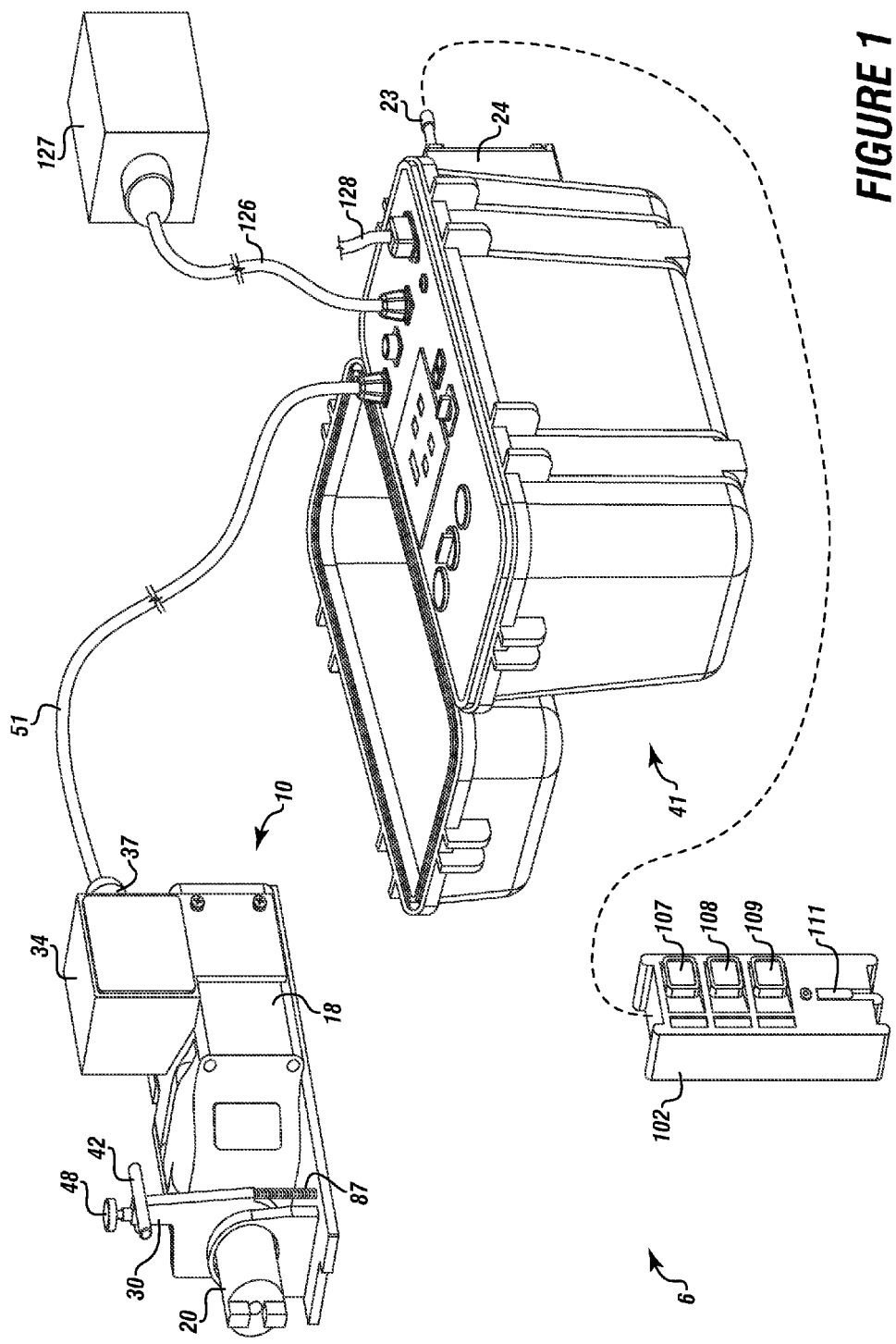
FIG. 1 depicts a remote racking tool according to one or more embodiments.

The present embodiments are detailed below with reference to the listed Figures.

DETAILED DESCRIPTION OF THE EMBODIMENTS

Before explaining the present apparatus and method in detail, it is to be understood that the apparatus and method are not limited to the particular embodiments, and that they can be practiced or carried out in various ways.

The present embodiments relate to a remote racking tool configured to enable operators to remain outside of an arc flash zone while installing or removing circuit breakers or other equipment. One or more embodiments of the remote racking tool can be configured for use with circuit breakers, such as MAGNE-BLAST™ circuit breakers from General Electric, switchgear, and the like.

One or more embodiments of the remote racking tool can be wirelessly operated, such that an operator can use a radio remote pendant station to operate the remote control assembly, which can in-turn operate the drive assembly while allowing the operator to remain outside of the arc flash zone.

In one or more embodiments, the operator can remain outside of the arc flash zone while manually using the remote control assembly to operate the drive assembly.

The remote racking tool can be lightweight, portable, and can have a small size; thereby allowing operators to easily carry the remote racking tool. For example, the remote racking tool can include a drive assembly that weighs less than 15 pounds.

The drive assembly can have a base plate, which can be a plate of flat steel. The base plate can have a length and width each ranging from about 4 inches to about 12 inches, and thickness ranging from about ⅛ of an inch to about ¼ of an inch.

A lip can be formed on the base plate. The lip can be a piece of metal or composite. In operation, the lip can be used to removably attach the drive assembly to a circuit breaker body and lid. The lip can extend beyond the base plate, and can include one or two segments that can each have a length ranging from about 1 inch to about 3 inches.

The base plate can be fastened, such as with bolts and nuts, to a motor. The motor can be a 120 volt motor, such as one from Milwaukee Electric Tool Corporation, variable drive motor, or another motor.

The motor can be adapted to rotate a rotatable shaft in both a clockwise and counter clockwise direction.

A drive coupler can be removably attached to the rotatable shaft. The drive coupler can have different diameters depending upon the switchgear, circuit breaker, such as MAGNE-BLAST™ circuit breakers from General Electric, component being operated upon.

In operation, the drive coupler can be rotated by the motor in a first direction to install a circuit breaker to switchgear, and rotated in the opposite direction to remove the circuit breaker from switchgear.

The drive coupler can be made from steel, be cylindrical in shape, and can have a diameter ranging from about 1 inch to about 2 inches.

The drive coupler can have a planar face with a perimeter. A central hole can be formed in the planar face, and can extend through the drive coupler.

A first prong can extend from the planar face between the central hole and perimeter. The first prong can be made of the same material as the drive coupler. The first prong can have a rectangular shape with a planar end, and can have a constant width.

A second prong can extend from the planar face, and can have the same size and be made of the same material as the first prong. The second prong can extend from the planar face between the central hole and perimeter opposite the first prong.

In operation, the first prong and second prong can engage the circuit breaker for removal or installation thereof.

A spring loaded engagement lever latch, which can be made of aluminum or another metal, can connect with the base plate. The spring loaded engagement lever latch can extend from the base plate and encircle the drive coupler, and can be configured to allow the drive coupler to spin freely.

The spring loaded engagement lever latch can have an opening through which the drive coupler can pass, and can function as an alignment tool to keep the drive coupler in a centralized orientation.

The spring loaded engagement lever latch can have a lever and a threadable member for connecting the drive assembly at a second point of contact to the switchgear, while also keeping the drive coupler properly aligned on the circuit breaker. The threadable member can be a finger tightening mechanism, such as a thumb screw or threadable tension screw. The threadable member can engage a surface around the switchgear in a removable and easy to install manner. The spring loaded engagement lever latch can also have a compression spring.

The spring loaded engagement lever latch can have a handle, which can be used for pulling the spring loaded engagement lever latch to align the drive coupler with the circuit breaker for installation or removal thereof.

A junction box can be mounted to the motor. The junction box can have a power and signal receptacle, which can receive power and signals from the remote control assembly.

The junction box can be made of aluminum, another lightweight metal, or plastic, and can have a length, width, and height smaller than the length, width, and height of the motor. In one or more embodiments, the junction box can have a size configured to be just large enough to support wires in the junction box and a signal and power plug.

The remote control assembly can be connected with the junction box through a motor power cable and/or supervisory link cable.

The remote control assembly can have a body and lid. The body can have a bottom and four connected sides.

The lid can be removable from the body and/or hinged to the body, thereby allowing the lid to be securely opened and closed therefrom.

The body and lid can include a plurality of aligned holes, allowing the lid to be padlocked to the body for security. The lid can include a plurality of latches that enable the lid to securely connect with the body. The lid can also include a handle for carrying the body and lid.

The lid can have a groove on an inside edge thereof for receiving a compressible seal. The compressible seal can be used to create a watertight connection between the lid and body.

The body and lid can support an on-off power switch, which can be mounted to a face plate in the body. The on-off power switch can be used to turn the drive assembly on and off.

The remote control assembly can contain a battery and battery charger. The battery can connect to the on-off power switch in the face plate. In one or more embodiments, the remote control assembly can operate using 120 volt AC current, which can be provided from a wall switch or generator.

In a first example of operation, the remote racking tool can be used to install and/or remove circuit breakers. For example, an operator can ensure that a circuit breaker to be operated upon is in an open position, such as by checking that an "open" indicating light is on and that a mechanical indicator on the circuit breaker design displays "open" as well.

The circuit breaker can be verified to be in a fully connected position or fully disconnected position, such as by checking an indication on a current control module installed in the remote control assembly.

The drive coupler can be placed onto the motor of the drive assembly. The motor can be installed to the correct location using two dowel rods, which can be located on the bottom of the base plate to maintain alignment thereof.

The drive assembly can be secured into place by latching the spring loaded engagement lever latch on the back side of the base plate with the metal surrounding the switchgear, metal surrounding the circuit breaker, or metal adjacent the circuit breaker, such as MAGNE-BLAST™ circuit breakers from General Electric.

The handle of the spring loaded engagement lever latch can be pulled toward the motor to engage the drive coupler on the drive assembly with a cubicle racking mechanism. The operator can ensure that the drive coupler mates properly with the cubicle racking mechanism. For example, the operator can hand rotate the motor to ensure proper alignment of the drive coupler and cubicle racking mechanism.

With the handle pulled toward the motor, the operator can use the spring loaded engagement lever latch to hold down the handle. The spring loaded engagement lever latch can be rotated over the top of the handle while being pulled towards the motor. The handle can be firmly secured in place by tightening the threadable member on the handle.

A tilt sensor can be mounted onto a level surface of the circuit breaker. The tilt sensor can be placed such that the tilt sensor does not interfere with the operation of the drive assembly. A tilt switch cable can be connected with the remote control assembly.

The motor power cable can be connected with the power and signal receptacle on the motor of the drive assembly and with the remote control assembly.

The supervisory link cable can be connected with a control outlet or supervisory link receptacle of the remote control assembly. The control outlet or supervisory link receptacle can be disposed at a location in which a stock elevating motor can be connected.

An A/C power cable can be connected to the drive assembly, such as through an A/C input located on the face plate of the remote control assembly. The A/C power cable can be connected with a power source.

In a second example of operation of the remote racking tool, the remote racking tool can be used to remotely remove and/or install circuit breakers using preset limits.

For example, an operator can determine if a circuit breaker is in the open position. The open position can be determined by manufacturer specifications of the circuit breaker.

The operator can determine which setting to use for the power control style selector. The instructions for determining which setting to use for the power control style selector can be located on the face plate of the remote control assembly.

The operator can set a switch of the remote control assembly to "1" if the motor is a universal motor with a raise/lower switch located on the back side of the motor of the drive assembly.

The operator can place the drive coupler onto the rotatable shaft of the motor.

The operator and drive assembly can secure the drive assembly into place by latching the spring loaded engagement lever latch on the back side of the base plate with the metal surrounding the switchgear, metal surrounding the circuit breaker, or metal adjacent the circuit breaker, such as MAGNE-BLAST™ circuit breaker from General Electric.

The operator can pull the handle of the spring loaded engagement lever latch toward the motor to engage the drive coupler on the drive assembly with a cubical racking mechanism, such as the circuit breaker.

The operator can ensure that the drive coupler mates properly with the cubicle racking mechanism. For example, the motor can be rotated to ensure proper alignment of the drive coupler with the cubical racking mechanism.

The spring loaded engagement lever latch can be used to hold down the handle with the handle pulled toward the motor. The spring loaded engagement lever latch can be rotated over the top of the handle while being pulled towards the motor.

The handle can be tightened into place on the surface near the remote racking tool, such as by tightening the threadable member on the handle until the handle is firmly in place.

The tilt sensor can be mounted onto a level surface of the circuit breaker. The tilt sensor can be placed such that the tilt sensor does not interfere with the operation of the remote racking tool. The tilt switch cable can be connected with the remote control assembly.

The motor power cable can be connected with the power and signal receptacle on the motor of the drive assembly and with the remote control assembly.

The supervisory link cable can be connected between the remote control assembly and a control outlet. The control outlet can be disposed at a location that a stock elevating motor can be connected.

The remote racking tool can be turned on using a main power switch on the current control module of the remote control assembly.

If the remote racking tool includes a radio remote pendant station, the remote racking tool can be set to either a local option or radio option prior to turning the power on.

The operator can ensure that a display on the current control module shows the circuit breaker in the disconnected position by examining an indication on the current control module.

The operator can press a tilt sensor reset button located on a top of the tilt sensor to zero the tilt sensor.

The operator can exit an arc flash zone with the radio remote pendant station, while leaving the remote control assembly proximate the remote racking tool.

The operator can operate the remote racking tool using the radio remote pendant station. The radio remote pendant station can be activated by placing a magnetic key into a magnetic key slot.

The operator can equip extensions to the remote control assembly to allow the remote control assembly to be disposed at greater distances from the drive assembly.

The operator can press a radio remote install button to activate the current control module of the remote control assembly, which can initiate installation of the circuit breaker.

If the remote control assembly is outside of the arc flash zone, the operator can press the install button on the remote control assembly, which can signal the drive assembly to install the circuit breaker or other component being operated upon.

The operator can press a radio remote remove button on the radio remote pendant station, which can communicate with the drive assembly via the remote control assembly to remove an installed circuit breaker.

If the remote control assembly is outside of the arc flash zone, the operator can press the remove button on the remote control assembly, which can signal the drive assembly to remove the circuit breaker or other component being operated upon.

The drive assembly can be disconnected by releasing the spring loaded engagement level latch once the installation and/or removal operations are complete.

In a third example of operation, the remote racking tool can be used to remotely remove and/or install circuit breakers with minimal user interaction.

For example, an operator can ensure that the remote racking tool has been installed.

It can be determined if a circuit breaker is in the open position, which can be performed using manufacturer specifications of the circuit breaker.

It can be determined which setting to use for the power control style selector, which can be accomplished using instructions located on the face plate of the remote control assembly.

The switch of the remote control assembly can be set to "1" if the motor is a universal motor with a raise/lower switch located on the back side of the motor.

The drive coupler can be placed onto the rotatable shaft of the motor.

The handle can be pulled toward the motor to engage the drive coupler on the drive assembly with a cubical racking mechanism, such as the circuit breaker. The operator can ensure that the drive coupler mates properly with the cubicle racking mechanism. For example, the motor can be rotated to ensure proper alignment of the drive coupler with the cubical racking mechanism.

With the handle pulled toward the motor, the spring loaded engagement lever latch can be used to hold down the handle. The spring loaded engagement level latch can be rotated over the top of the handle and kept pulled toward the motor. The handle can be tightened into place on the surface near the remote racking tool by tightening the threadable member on the handle until the handle.

The tilt sensor can be mounted onto a level surface of the circuit breaker. The tilt sensor can be placed such that the tilt sensor will not interfere with the operation of the remote racking tool. The tilt switch cable can be connected with the remote control assembly.

The motor power cable can be connected with the power and signal receptacle on the motor of the drive assembly and with the remote control assembly.

The supervisory link cable can be connected between the remote control assembly and a control outlet. The control outlet can be disposed in a location in which a stock elevating motor can be connected.

The power control style selector of the remote control assembly can be set to the number "1" setting, which can be used for manual operation.

The on-off power switch of the remote control assembly can be set to the "on position".

The operator can press and hold the install button on the current control module, or press and hold the remove button on the current control module. The install button and/or remove button can be pressed while the power is on.

The install button and/or remove button can be pressed while pressing the down button on the current control module, which can set the current control module to 0.0 amps.

The current control module down button on the current control module can be pressed and held until the decimal point on the display of the current control module begins to blink, which can allow the remote control assembly to measure current output.

The operator can exit the arc flash zone with the remote control assembly.

The maximum current for both the install and remove racking operations can be recorded using the current control module of the remote control assembly. The maximum current can be determined by the remote control assembly, which can be recorded by the operator. The maximum current can be determined by the remote control assembly over a measuring interval, such as a 1 minute interval.

The operator can press the current control module down button of the current control module to store the maximum current. The maximum current can be reset by pressing the current control module down button again.

The operator can continue to operate the drive assembly using the remote control assembly to prevent damage to the circuit breaker.

The operation of the remote racking tool can be performed simultaneously during the measuring process.

The circuit breaker can be verified to be in the open position.

The operator can ensure that the control power style selector is set to allow for manual operation.

The operator can set the current control module of the remote control assembly for automatic current control operation.

The operator can press and hold the install button and/or the remove button of the current control module while pressing the current control module up button and/or current control module down button, which can allow the operator to set the desired current.

The desired current can be higher than the measured maximum current, such as up to 10 percent higher than the measured maximum current. The operator can release the install button and/or remove button once the desired current is reached.

The operator can press the install button and/or remove button on the remote control assembly to begin the install or remove process. Also, the operator can begin the install or remove process by pressing the radio remote install button and/or radio remote remove button on the radio remote pendant station.

The install or remove process can continue until the current draw reaches a predetermined set point.

The operator can then disconnect the drive assembly, store the drive assembly, store the remote control assembly, or combinations thereof.

Turning now to the Figures, FIG. 1 depicts an embodiment of a remote racking tool 6, including a drive assembly 10 and remote control assembly 41.

The drive assembly 10 can include a drive coupler 20, which can be secured in place by a spring loaded engagement lever latch 30. The spring loaded engagement lever latch 30 can include a threadable member 48, spring 87, and handle 42.

The drive coupler 20 can extend through the spring loaded engagement lever latch 30. In operation, the spring loaded engagement lever latch 30 can be latched for securing the drive coupler 20 in place. For example, the spring loaded engagement lever latch 30 can be engaged and moved using the handle 42, and can be latched in place using the threadable member 48.

The drive coupler 20 can be connected with a motor 18. The motor 18 and spring loaded engagement lever latch 30 can be connected with a base plate 12.

A junction box 34 can be connected with a top of the motor 18. The junction box 34 can have a power and signal receptacle 37 through which the junction box 34 can be connected with a motor power cable 51. The motor power cable 51 can be connected with the remote control assembly 41.

A tilt switch 127 can be in communication with the drive assembly 20, a tilt switch cable 126, and the remote control assembly 41. For example, the tilt switch 127 can connect with the tilt switch cable 126, which can connect with the remote control assembly 41.

A supervisory link cable 128 can be connected to the remote control assembly 41 and with a radio remote transmitter/receiver 24.

The radio remote transmitter/receiver 24 can include an antenna 23. The radio remote transmitter/receiver 24 can be in communication with a radio remote pendant station 102 through the antenna 23. As such, the remote racking tool 6 can be wireless.

The radio remote pendant station 102 can include a radio on/off button 107, radio install button 108, radio remove button 109, and radio remote on-board power supply 111.

The radio remote pendant station 102 can be used to remotely control the remote control assembly 41 through communication with the antenna 23.

Figure 2:
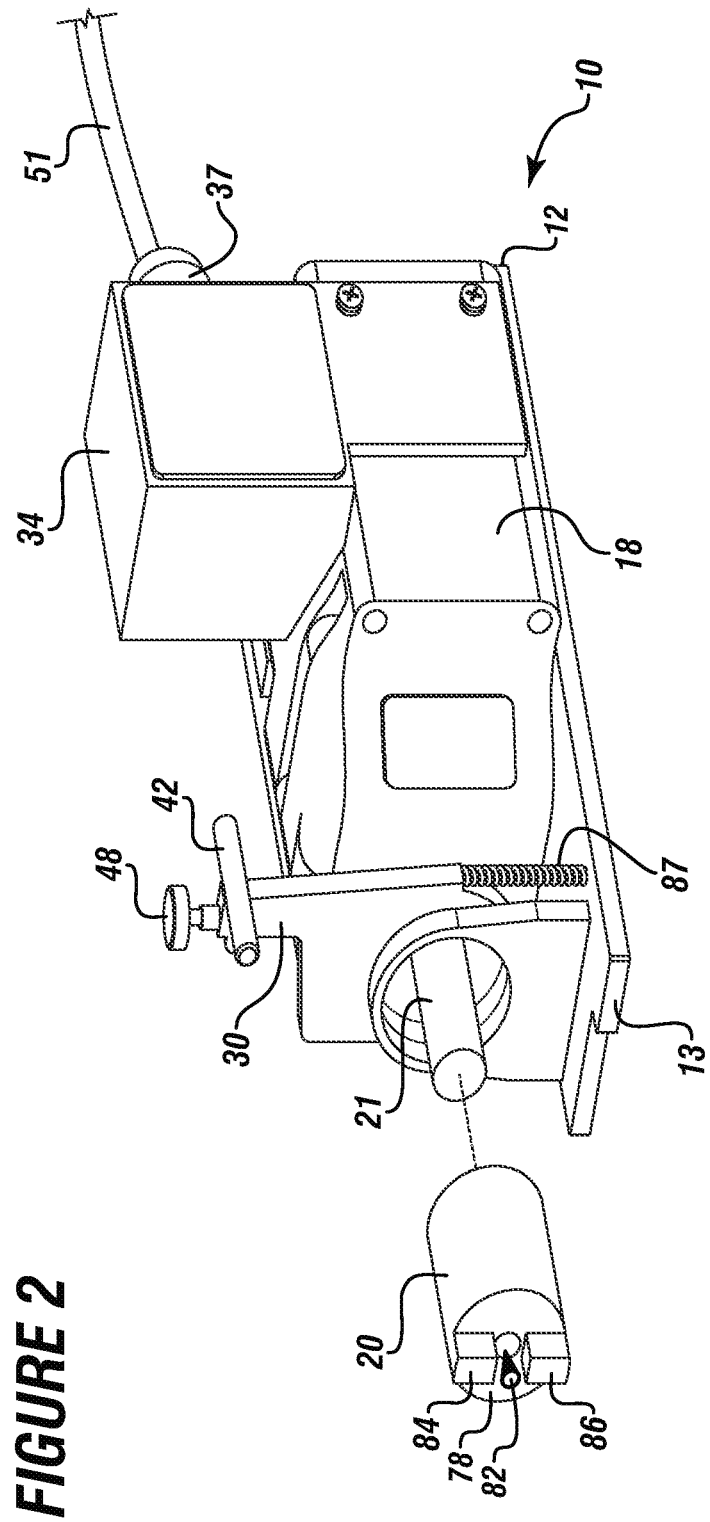
FIG. 2 depicts a detail of a drive assembly according to one or more embodiments.

FIG. 2 depicts a detail of the drive assembly 10 with the drive coupler 20 detached from a rotating shaft 21.

The drive assembly 10 can include the drive coupler 20, which can be secured in place by the spring loaded engagement lever latch 30. The spring loaded engagement lever latch 30 can include the threadable member 48, the spring 87, and the handle 42.

The drive coupler 20 can have a planar face 78. The planar face 78 can have a central hole 82, first prong 84, and second prong 86.

The drive coupler 20 can be connected with the motor 18, such as via the rotatable shaft 21. The rotating shaft 21 can be engaged with the motor 18. In operation, the motor can rotate the rotating shaft 21, and the rotating shaft 21 can rotate the drive coupler 20.

The motor 18 and spring loaded engagement lever latch 30 can be connected with a base plate 12. The base plate 12 can include a lip 13.

The junction box 34 can be connected with a top of the motor 18. The junction box 34 can have the power and signal receptacle 37 through which the junction box 34 can be connected with the motor power cable 51.

Figure 3:
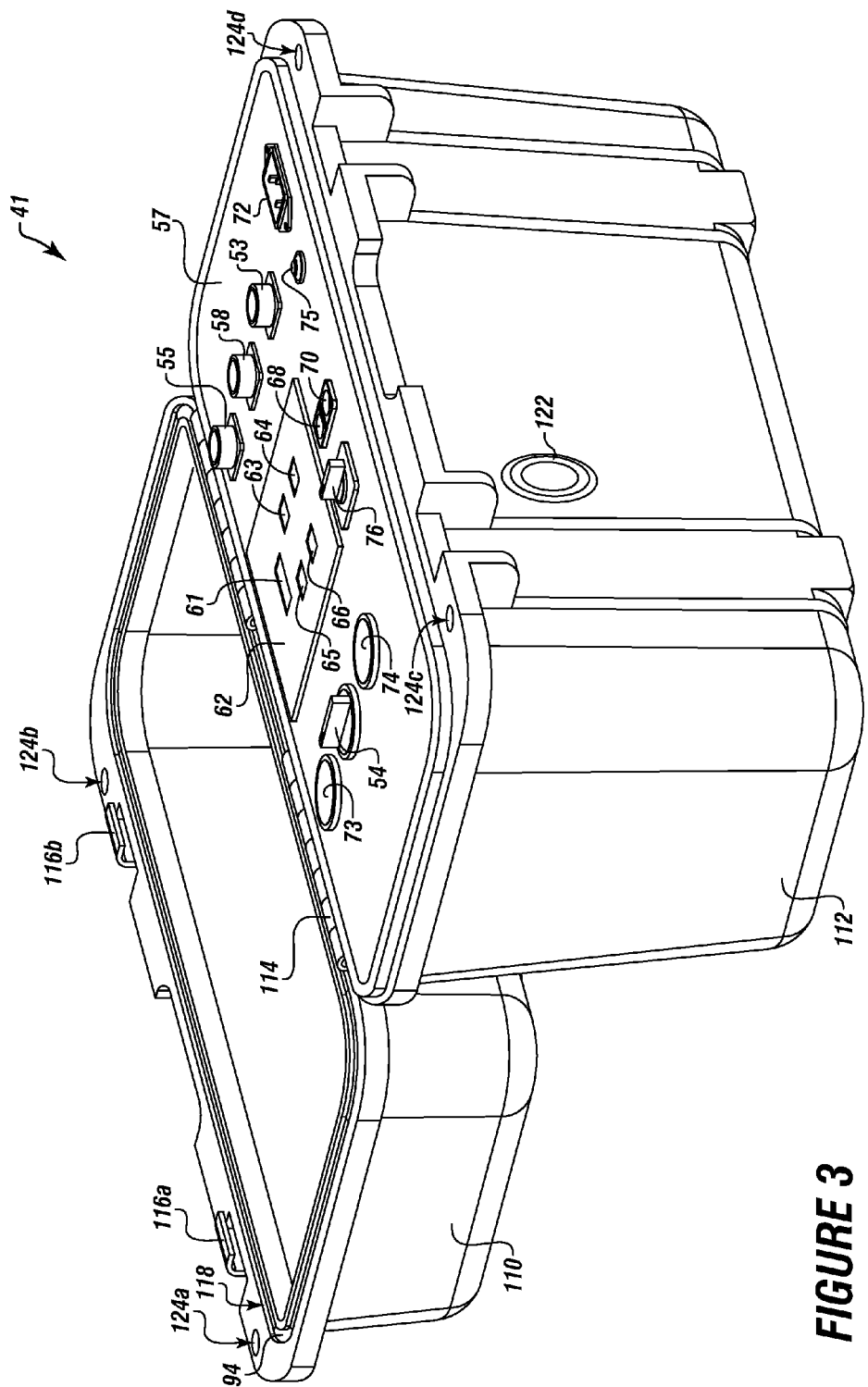
FIG. 3 depicts a detail of a remote control assembly according to one or more embodiments.

FIG. 3 depicts the remote control assembly 41, including a lid 110 and a body 112.

The body 112 can include a face plate 57. The face plate 57 can have a motor power receptacle 55, supervisory receptacle link 53, tilt switch receptacle 58, A/C input 72, remote control assembly circuit breaker 75, install button 68, remove button 70, control power style selector 76, current alarm 73, on-off power switch 54, and tilt alarm 74.

In operation, the current alarm 73 can provide a steady light or other signal to indicate when the drive assembly operating, and a flashing light or other signal to indicate that a command to stop the drive assembly has be transmitted.

The on-off power switch 54 can be used to selectively provide power to the drive assembly.

The tilt alarm 74 can indicate when the tilt sensor senses that a circuit breaker has tilted.

The control power style selector 76 can be used to select which gear the motor of the drive assembly was designed to operate in. For example, the control power style selector 76 can have a setting "1" for operation with a universal motor, and a setting "2" for operation with a DC motor with a series shunt.

The remote control assembly circuit breaker 75 can be a 15 amp circuit breaker.

The face plate 57 can have a current control module 62. The current control module 62 can have a display 61, current control module install button 63, current control module remove button 64, current control module up button 65, and current control module down button 66.

The body 112 can also include a vent 122, and can be connected with the lid 110 via one or more hinges 114. The body 112 can be securely locked with the lid 110 via aligned holes 124a, 124b, 124c, and 124d. For example, a first lock can be simultaneously engaged through the aligned holes 124a and 124c, and a second lock can be simultaneously engaged through the aligned holes 124b and 124d.

The lid 110 can include a groove 118, which can be used to hold a seal 94.

The lid 110 can include one or more latches 116a and 116b. The latches 116a and 116b can be used to compress the seal 94 against the body 112 to form a watertight connection between the lid 110 and body 112.

Figure 4:
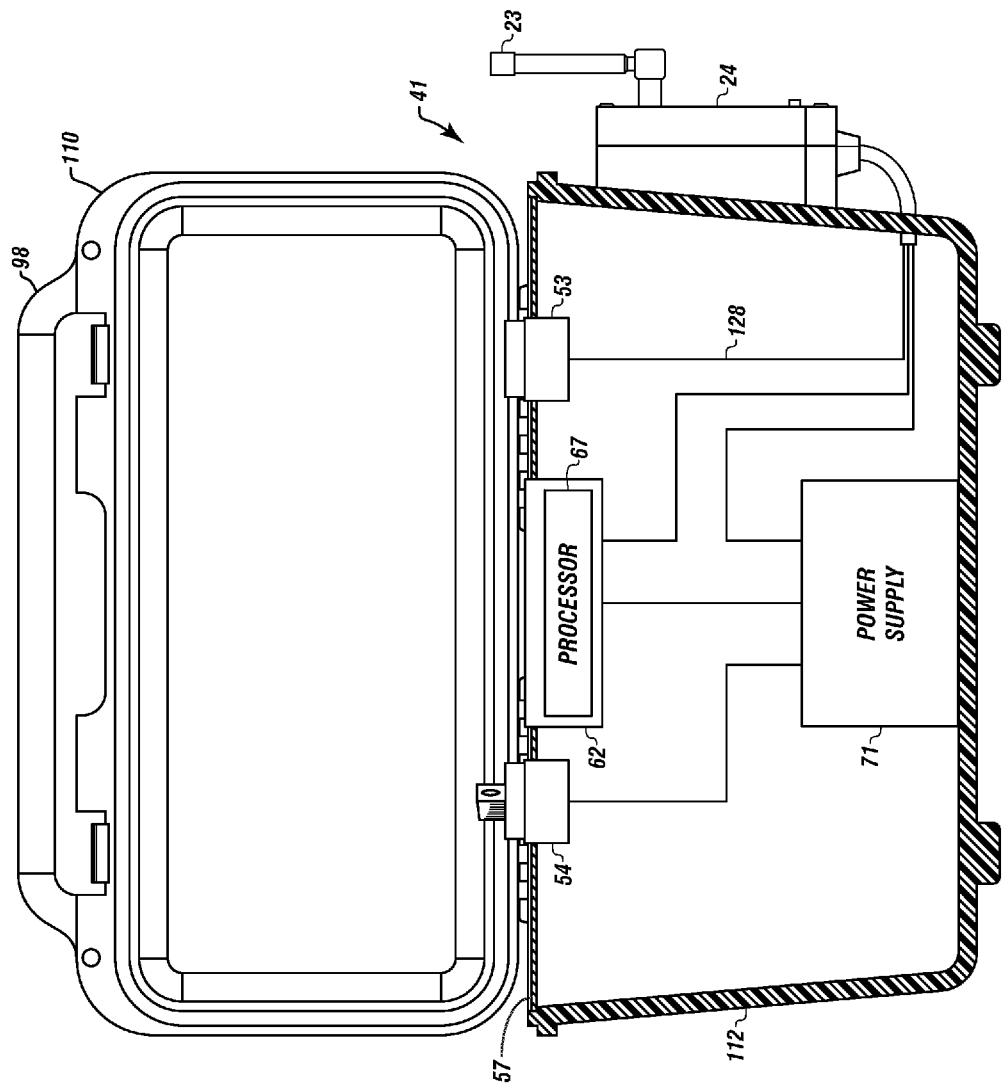
FIG. 4 depicts a detail of an interior of the remote control assembly according to one or more embodiments.

FIG. 4 depicts a cross-sectional view of an embodiment of the remote control assembly 41.

71 and radio remote transmitter/receiver 24 can be located within or connected to the body 112, and can be disposed under the face plate 57.

The power supply 71 can be in communication with the on-off power switch 54 and a processor 67 of the current control module 62. The processor 67 of the current control module 62 can be in communication with the radio remote transmitter/receiver 24.

The radio remote transmitter/receiver 24 can also be in communication with the supervisory link receptacle 53 through the supervisory link cable 128.

In one or more embodiments, the remote control assembly 41 can have a handle 98, which can be connected with the lid 110 or the body 112.

While these embodiments have been described with emphasis on the embodiments, it should be understood that within the scope of the appended claims, the embodiments might be practiced other than as specifically described herein.

What is claimed is:

1. A remote racking tool comprising:
   a base plate having a lip for removably latching onto a circuit breaker housing;
   a motor secured to the base plate, wherein the motor is engaged with a rotating shaft;
   a drive coupler connected to the rotating shaft, wherein the drive coupler is rotatable by the motor for engaging a circuit breaker of a switchgear to remove or install the circuit breaker;
   an engagement lever latch connected to the base plate, wherein the engagement lever latch includes an opening through which the drive coupler freely rotates and a threadable member for providing a secondary attachment to the switchgear;
   a remote control assembly communicatively coupled to the motor to drive the motor.

2. The racking tool of claim 1, wherein the engagement lever is spring loaded.

3. The racking tool of claim 1, wherein the spring loaded engagement lever latch includes a compression spring.

4. The racking tool of claim 3, wherein the spring loaded engagement lever latch further comprises a handle for pulling the spring loaded engagement lever latch to align the drive coupler with the circuit breaker for installation or removal thereof.

* * * * *